Nov. 27, 1934.                R. S. TROTT                1,981,886
                           ENGINE MOUNTING
              Original Filed Nov. 24, 1928    2 Sheets-Sheet 1
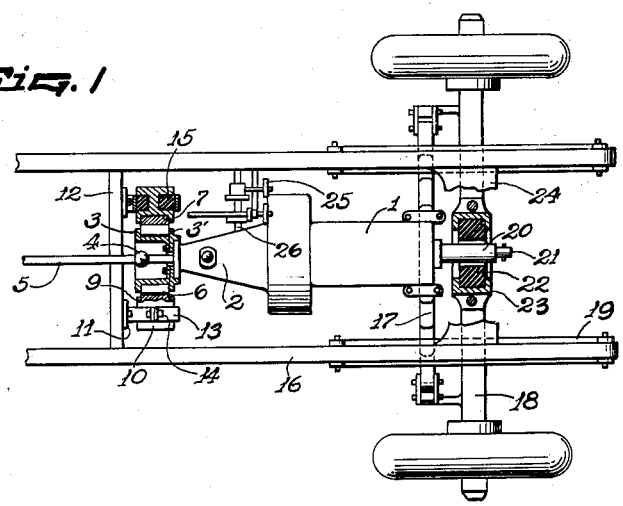
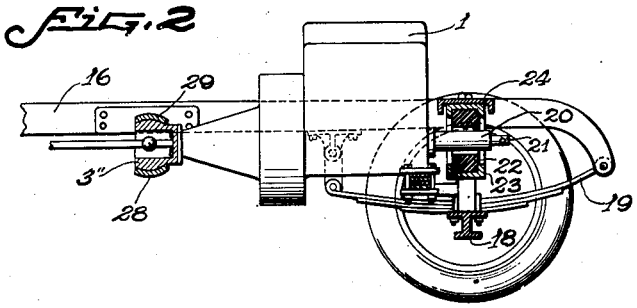
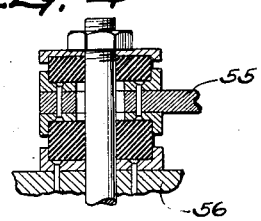
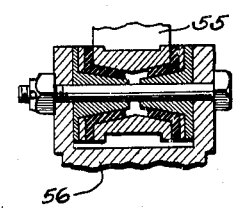
Inventor
Rolland S. Trott
Attorney Nov. 27, 1934.  R. S. TROTT  1,981,886
ENGINE MOUNTING
Original Filed Nov. 24, 1928  2 Sheets-Sheet 2
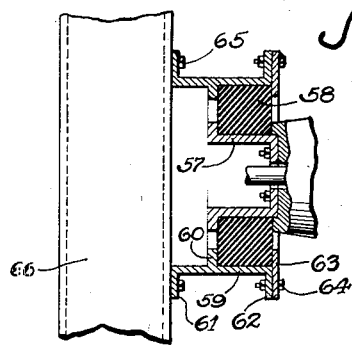
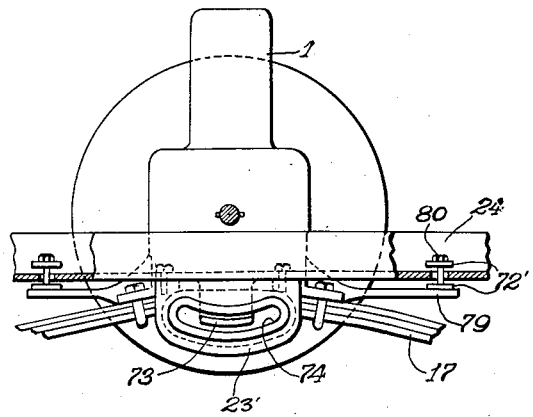
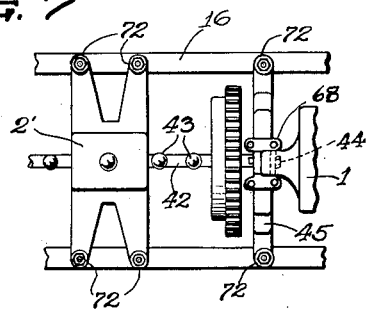
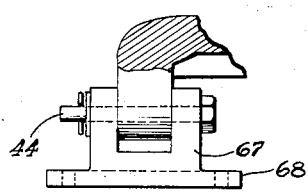

Patented Nov. 27, 1934

1,981,886

UNITED STATES PATENT OFFICE 1,981,886

ENGINE MOUNTING

Rolland S. Trott, Denver, Colo.

Original application November 24, 1928, Serial No. 321,634. Divided and this application December 12, 1932, Serial No. 646,905

20 Claims. (Cl. 180—64)

This invention relates to engine mountings for engines having force and torque cushioning movements with respect to the support or frame upon which they are mounted and is a division of my application for patent on engine mountings filed on November 24, 1928, Serial No. 321,634, now Patent No. 1,890,871, granted December 13, 1932.

My invention provides a power plant mounting in which the forces due to the operation of the power plant will be largely eliminated from the frame of the vehicle and in which there will be practically no substantial differential movement between the frame or body of the vehicle and the rear of the power plant so that standard or nearly standard pedal and gear shift constructions may be used. The power plant is normally at least partly supported on the frame in a manner that it can transmit substantially no torque to the frame. The power plant is connected to the axle in such a manner as to normally transmit all torque reaction from the power plant to the axle directly and without said reaction passing to the axle through the body or through the frame upon which the body is mounted.

I provide 1st, a spring connection extending directly between the engine and the front axle, which spring connection carries some of the weight of the engine and transmits the torque to the axle from the engine and is adapted to form a torsional cushion to resiliently maintain the position of the engine against the torque reaction; 2nd, a pivotal mounting means between the frame and the engine unit adapted to freely permit the torsional cushioning movement of the engine, the pivotal mounting means being preferably concentric with the crankshaft of the engine and adapted to carry part of the weight of the engine unit. The engine unit is mounted on said pivotal mounting and spring connection so as to be capable of movement in any direction, at least at the front, in an orbital path.

The object of my present invention is to restrain and limit the freedom of movement in all directions, for which purpose I have provided a normally inactive cushion between the engine unit on the frame, which cushion surrounds a projection on the engine to be engaged thereby and limit freedom of movement in all directions.

This construction is fully explained below and shown in the drawings in which:—

Figure 1 is a fragmentary plan view and partial section of a unit power plant construction with open propeller shaft, semi-elliptic front springs and a roller bearing mounted in rubber for the support of the rear of the power plant.

Figure 2 is a side view and partial section of the same but showing a rear power plant support composed of a plain globular bearing.

Figure 3 is a detail showing a rubber mounting construction to be used and adapted for mounting the power plant or any part thereof on either frame or axle.

Figure 4 is a detail showing a modified form of spring or power plant rubber mounting.

Figure 5 is a detail showing a modified form of mounting of the power plant on the frame.

Figure 6 is a detail showing a modified form of normally inactive cushion construction.

Figure 7 is a detail showing the transmission mounted on the frame and separate from the engine, the engine at the rear having a spring mounted pivotal support.

Figure 8 is a detail of the rear pivotal mounting of Figure 7.

It will be seen that most of the drawings contain exaggerations in part for the sake of clearness.

In Figure 1, the engine (1) has the transmission (2) integral therewith, forming a unit power plant, or engine unit.

To the rear end of the power plant is attached the mounting bracket (3), surrounding and concentric with the universal joint (4), to which is connected the propeller shaft (5). Between the mounting bracket (3) and the transmission (2) is clamped the plate (3').

The bracket (3) forms the inner track of a roller bearing having rollers (6) and outer track (7). The plate (3') acts to retain the rollers (6).

The flanged support ring (9), provided with the flanged support pins (10), receives the outer track (7), but may be made integral therewith if desired.

The frame brackets (11), properly attached to the frame cross member (12), are each provided with a cap (13), secured thereto by the bolts (14), and thereby forming an apertured end for the bracket.

The flanged support pins (10) are surrounded by the cushion members (15), composed of proper cushioning material such as rubber, and supported in the frame brackets (11).

It will be seen that this method of mounting the rear end of the power plant, permits torsional action of the power plant with respect to the frame, and because of the free movement provided by the roller bearing mounting, the torsional movement of the power plant can impart no vibration to the frame (16) that is due to torque reaction.

And the cushion supplied by the members (15) permits slight distortions of the power plant with respect to the frame without strain, noise, or shock, and will tend to absorb any vibration due to lack of perfection in the construction of the power plant. The front end of the power plant is supported on the cross spring (17), which is mounted on the front axle (18) in any proper manner, either entirely metallic as shown, or through rubber or other cushioning means, forms of which are illustrated in Figures 3 and 4.

The spring (17) is to be properly proportioned to its load, with respect to the springs (19) which support the frame (16) and their proportioning with respect to their load, so that when the vehicle encounters a road shock, the frame (16) and the power plant will flex their respective springs the same amount and there will be as little differential movement as possible between them. The starting crank bracket (20), which naturally is concentric with the crankshaft (21) of the engine, is surrounded by a normally inactive rubber cushion (22), supported in a housing (23) and properly attached to the front frame member (24), the rubber cushion being normally slightly spaced from the bracket (20).

Each explosion of the engine which tends to make it revolve about its crankshaft will be resiliently cushioned by the action of the spring (17), the slight movement of the power plant during this cushioning being permitted by the rollers (6), so that no torque effect will be transmitted to the frame (16).

When road shocks are encountered, the spring (17) will act in unison with the frame springs (19), and if for any reason there is a tendency for the movement of the power plant to be different from that of the frame (16), the action of the normally inactive cushion (22) will limit such differential movement.

Any movement at the cushion (22) is permitted by the action of the cushion members (15) of the rear mounting, and is taken care of by the connection between the clutch shaft (26) and the clutch pedal (25).

It will be seen that if the engine and power plant as a whole are well built and properly balanced, and the springs (17) and (19) are of exactly the right strength and performance, the bracket (20) will remain constantly concentric with the cushion (22), and there will be no relative movement between the frame (16) and the power plant.

All this, however, requires such an exacting set of conditions that they are likely to be met with only in a small percentage of constructions.

If it is found that the torque effect of the engine explosions tends to raise or lower the front end of the power plant, and thus put load upon the pivotal construction, it may be found advantageous to have the mounting normally put a load of opposite direction on the pivotal mounting so that when the engine is pulling the load will be substantially removed therefrom.

It will be seen that though the power plant may be carried in part by the frame, the torque reaction upon the engine when it turns the propeller shaft is carried to the front axle directly, either entirely, or nearly so.

The longitudinal position of the rear power plant support may, of course, be changed as desired, but I prefer it to be aligned and concentric with the universal joint at the front end of the propeller shaft for the reason that such position permits both power plant and propeller shaft to move independently of each other. That is, the propeller shaft may move due to action of the rear springs of the vehicle, without affecting the power plant, and the power plant may move slightly, due to differential movement between the frame and the front of the power plant, without affecting the propeller shaft.

The vertical position of the rear power plant mounting, I prefer to be as shown in Figure 1, that is, concentric with the crankshaft, for the reason that the torque of the engine tends to rotate it about the crankshaft as a center, and such concentric mounting will generally give better results.

But, as shown in Figure 7, both the longitudinal and the vertical positions of the rear support may vary, if desired, to better conform to the general construction of the power plant or engine in question.

The front end of the engine may be controlled by the normally inactive rubber cushion shown in Figure 1, which is concentric with the engine crankshaft, or by the rubber cushion shown in Figure 6, which is not concentric with the crankshaft, or by any other form or type of normally inactive bumper construction.

Instead of the starting crank bracket being concentric with the rubber cushion, or midway between the upper and the lower contact surfaces of the cushion, when the vehicle is unloaded, the parts may, if desired, be so proportioned that the starting crank bracket will bear some weight upon the rubber cushion when the vehicle is empty, whereby when the normal load is carried the frame will be lowered till the starting crank bracket is concentric with the rubber cushion.

The front end of the engine may also be controlled in its vertical movements by any of the well known devices for such purposes, attached to the engine and to the front axle; a similar device may be used to connect the frame and the front axle; and the two devices properly adjusted to give the frame and the engine the same movement with respect to the axle, and in that way control the differential movement between frame and engine.

And in place of, or in addition to, the normally inactive rubber cushion construction to control the differential movement between the engine and the frame, any proper spring control device may be used, with the device set or constructed to be normally inactive, if desired.

In the construction shown in Figure 2, the mounting bracket (3″) carries the inner member of a ball and socket mounting bearing.

The outer member of this joint is composed of a cross piece (28) which is secured to the frame (16), and a cap (29), which is properly secured to the piece (28). This construction is cheaper and simpler than that shown in Figure 1, but provides the same action, except for the lack of cushion and the additional friction of the plain surfaces.

In the construction shown in Figure 7, the transmission (2′) is mounted directly upon the frame (16), separate from the engine (1). The engine (1) is connected to drive the transmission through the shaft (42), which is provided with two universal joints (43). The engine (1) is supported at the rear upon the trunnion pin (44), which is located directly above the crankshaft, and is mounted upon the cross spring (45), which is in turn mounted upon the frame by the rubber mountings (72).

If desired a rubber mounting, two forms of which are shown in Figures 3 and 4, may be used in place of the trunnion pin construction and an ordinary cross frame member may be used in place of the spring (45).

These constructions, while I do not consider them as perfect in some ways as those having mountings concentric with the crankshaft, will with proper design, come quite close to giving the same results as obtained by the other constructions, since the effect of the lack of concentricity of the mounting may be to some extent taken up by the flexibility of the spring (45) or of the rubber mounting, or by other factors in the vehicle.

The mounting of the transmission directly upon the frame, while it will eliminate the relative movement of the frame and the gear shift lever, will not tend to reduce gear noises in low and intermediate gears. For this reason I have shown the transmission mounted on the frame by the rubber mountings (72).

Figure 3 shows one form of rubber mounting, which may be used between the frame and the rear cross member which supports the rear of the power plant, or between the engine and the front supporting spring, or between the engine spring and the front axle, or the frame springs and the frame, or between the frame springs and the front axle, all depending upon the particular constructions employed and the judgment of the designer.

Figure 4 shows another form of rubber mounting, to be used in the same manner as the form shown in Figure 3. The parts to be connected by this mounting are represented by the members 55 and 56.

In Figure 5, the bracket (57) is centered on the power plant, which acts to position the rubber cushion (58) on the bracket (57). The support (59) is provided with the flanges (60), (61) and (62). The plate (63), attached to the flange (62) by the bolts (64), positions the cushion (58) in the support (59) and against the flange (60). The bolts (65) through the flange (61), attach the support (59) to the frame cross member (66).

The cushion (58) provides a resilient mounting for the power plant, which not only cushions against horizontal or vertical shocks, but also permits the slight rotary movement of the power plant due to the resilient cushioning of the torque reaction as explained elsewhere.

In Figure 8, the bracket (67) is to be mounted by its flange (68), upon the cross spring (45), shown in Figure 4, and properly attached thereto, the movement due to cushioning the torque reaction being permitted by the pin (44).

In Figure 6, is shown a modified form of normally inactive rubber cushion, which is spaced from the crankshaft instead of being concentric therewith. The angular movement incident to the cushioning of the torque reaction is permitted by the clearance at either side of the bracket (73) with the rubber cushion (74). I do not prefer this construction, but it may be used where it fits into a design better than the concentric construction. The bracket (73) is an extension from the engine (1), either integral therewith or attached thereto. The housing (23') is properly attached to the frame cross member (24) and carries the rubber cushion (74).

This eccentric, normally inactive cushion construction permits the torsional cushion action of the engine, while still limiting its vertical movement with respect to the frame.

The bracket 79, not only provides for the attachment of the spring (17) to the engine (1), but also carries the cushion members (72') which co-operate with the lower horizontal web of the frame cross member (24).

These cushion members (72') are similar to the construction shown in Figure 4, except for the fact that the longer bolts (80) provide normally inactive cushions which are capable of adjustment for the amount of free movement they permit.

The bracket (79) and the lower horizontal web of the cross member (24) are represented by the members (56) and (55) of Figure 4.

The bracket (79) and the cushion members (72') act to resiliently limit the amount of torsional cushioning movement of the engine (1).

The free movement of the cushion members should be adjusted so that the ordinary torsional cushioning action of the engine is permitted. Thus, the bracket (73) limits the vertical and the bracket (79) limits the torsional movements of the engine with respect to the frame.

In production these brackets may be made integral or separate as desired, so long as they are properly adapted to perform their functions and act to maintain the engine within reasonable limits of its normal position.

But, in any case, I prefer some limiting bumper or control means in connection with the torsional cushioning movement of the engine as well as its vertical movement.

I am also aware that under some conditions it may be advantageous to position the pivotal mounting or mountings of the engine unit to one side of the center of weight, so as to tend to oppose the torque reaction of the engine unit by off-center weight in its mountings; or the off-center weight may be such as to operate against the springs in the same direction as the torque reaction acts upon the engine, so as to give the springs which resiliently oppose the torque reaction an initial load similar to that imposed by the torque reaction.

But, in any case, I consider all such variations and changes to be but mechanical equivalents whereby the engine unit is mounted partially upon the frame and normally partially direct upon the axle, so as to transmit no torque reaction whatever to the frame but to transmit all torque reaction to the axle direct.

It is, of course, understood that the automotive vehicle is to be provided with generator, starter, ignition and cooling equipment, as well as gasolene tank and connections, steering gear mounted on the frame and connections, throttle and spark controls adapted to be unaffected by the relative movement of the engine unit with respect to the frame, battery and connections, muffler mounted on the engine, or on the frame, and provided with a flexible exhaust pipe or connections, brake equipment and control, instruments and connections, hood, body, running board, pans, radiator and connections and in fact with all the usual appointments as well as those especially required by my invention and its combination with the rest of the vehicle. But, the greater part of all the above elements are omitted from the drawings for the sake of clearness.

Therefore, I do not wish to confine my protection narrowly to the exact constructions described and illustrated, but what I claim as new and desire to protect by Letters Patent, is as follows:—

I claim:

1. In an automotive vehicle, the combination of an engine unit, means mounting an end portion of the engine unit on the vehicle for torque cushioning movement, means mounting the other end portion of the engine unit on the vehicle for bodily movement thereof, and normally inactive cushion means arranged to limit the bodily movement of the last-mentioned end portion in any transverse direction relative to the vehicle.

2. In an automotive vehicle including axles, springs and frame, an engine unit mounted at one point upon the frame including a mounting permitting movement of the engine unit adapted to cushion the transverse torque reaction, said engine unit being connected to one of the axles by a mounting adapted to resiliently oppose said cushioning movement of the engine unit, and means adapted to limit the relative movement of the engine unit and the frame in said cushioning movements.

3. In an automotive vehicle including axles, springs, and frame, an engine unit mounted at one point upon the frame including a mounting permitting movement of the engine unit adapted to cushion the torque reaction, said engine unit being connected to one of the axles by a mounting adapted to resiliently oppose said cushioning movement of the engine unit, and means adapted to limit the vertical and the cushioning movements of the engine unit with respect to the frame.

4. In an automotive vehicle having a frame, an engine unit adapted to have movement with respect to the frame of the vehicle for the purpose of cushioning the transverse torque reaction of the engine unit, means mounting the engine unit at one end portion on the frame, and at the other end portion on one of the axles of the vehicle by a resilient mounting, and means adapted to limit the relative movement of the engine unit with respect to the frame.

5. In an automotive vehicle, including axles, springs, frame and engine unit, means connecting the engine unit to the frame at one point substantially incapable of transmitting transverse engine torque to the frame, means resiliently connecting the engine unit to one of the axles and adapted to transmit substantially the entire torque reaction of the engine unit to the axle, and means adapted to limit the relative movemen of the engine unit with respect to the frame.

6. In an automotive vehicle having a frame, an engine unit, means forming the rear mounting of the engine unit on the frame of the vehicle and substantially incapable of transmitting transverse torque reaction from the engine unit to the frame, means forming a resilient connection between the engine unit and a portion of the vehicle and adapted to transmit substantially all of the torque reaction from the engine unit to said portion, and means adapted to limit relative movement between the engine unit and the frame of the vehicle.

7. In an automotive vehicle having a frame and axles, an engine unit, means forming a mounting of the engine unit on the frame of the vehicle and substantially incapable of transmitting transverse torque reaction from the engine unit to the frame, means forming a resilient connection between the engine unit and one of the axles of the vehicle and adapted to transmit substantially all of the torque reaction from the engine unit to the connected axle, and means adapted to limit relative movement between the engine unit and the frame of the vehicle.

8. In an automotive vehicle having a frame, and axles, an engine unit adapted to have movement with respect to the frame of the vehicle for the purpose of cushioning the torque reaction of the engine unit, and mounted at one point upon the frame and upon one of the axles of the vehicle by a resilient mounting spaced from the first point, and cushion means adjacent the resilient mounting and adapted to limit the relative vertical and horizontal movement of the engine unit with respect to the frame.

9. In an automotive vehicle having a frame, axles, an engine unit adapted to have movement with respect to the frame of the vehicle and mounted upon the frame at one point, and at a second point spaced from the first, resiliently mounted on one of the axles of the vehicle and adapted to transmit to the axle the torque reaction of the engine unit, and means provided with compressible material spaced from the first mounting point to limit the vertical and horizontal movements between the engine unit and the frame.

10. In an automotive vehicle, including axles, springs, frame, and engine unit, means including non-metallic means connecting the engine unit to the frame at one point substantially incapable of transmitting engine torque reaction to the frame, means resiliently connecting the engine unit to one of the axles and adapted to transmit substantially the entire torque reaction of the engine unit to the axle, and means including compressible means spaced from said first-mentioned point and adapted to limit the relative movement of the engine unit with respect to the frame.

11. In an automotive vehicle having a frame and axles, an engine unit pivotally mounted at its rear on the frame of the vehicle, means forming a resilient connection between the engine unit and the front axle of the vehicle and adapted to transmit to the front axle substantially all of the torque reaction of the engine unit, and means provided with compressible material adapted to position the front end of the unit upon the frame and limit its movement with respect thereto.

12. In an automotive vehicle having a frame and axles, an engine unit, means forming the rear mounting of the engine unit on the frame of the vehicle and substantially incapable of transmitting transverse torque reaction from the engine unit to the frame, means forming a resilient connection between the engine unit and the front axle of the vehicle and adapted to transmit substantially all of the torque reaction from the engine unit to the front axle, and means provided with compressible material normally spaced from the front end of the unit to limit the relative movements of the engine unit and frame.

13. In an automotive vehicle having a frame and axles, an engine unit, means mounting the engine unit on the frame of the vehicle and substantially incapable of transmitting transverse troque reaction from the engine unit to the frame, means forming a resilient connection between the engine unit and one of the axles of the vehicle and adapted to transmit substantially all of the troque reaction from the engine unit to the connected axle, and means provided with compressible material and spaced from the first mounting means adapted to limit relative movement between the engine unit and the frame of the vehicle while permitting torque cushioning movement of said unit.

14. In an automotive vehicle including axles, springs, and frame, an engine unit, resilient means adjacent one end of said unit and connecting it directly to one of the axles of the vehicle and adapted to resiliently transmit the torque reaction of the engine unit directly to the axle, means adjacent the other end of the unit and connecting it to the frame and permitting torque cushioning movement with respect thereto, and means provided with compressible material adjacent the first-mentioned end of said unit and substantially incapable of transmitting torque reaction from said unit but acting to limit its movement with respect to the frame.

15. In an automotive vehicle including axles, springs, and frame, an engine unit, a transverse spring mounted upon one of the axles and attached to the engine unit and adapted to transmit substantially the entire torque reaction from the engine unit to the said axle, spaced means provided with compressible material mounting the engine unit upon the frame and substantially incapable of transmitting torque reaction from the engine unit to the frame and limiting the relative movement of said unit with respect to the frame.

16. In an automotive vehicle, the combination of an engine unit, and means for mounting the engine unit in the vehicle for transverse bodily movement of an end portion of said engine unit, said end portion having a projection, and a normally inactive cushion about said projection in spaced relation therefrom in position to restrain extreme bodily movement of the engine unit.

17. In an automotive vehicle having an engine unit mounted thereon for bodily movement of an end portion thereof in all directions, said engine unit having a projection, and a normally inactive cushion surrounding said projection in spaced relation therefrom in position to cushion extreme bodily movements of the engine unit.

18. In an automotive vehicle having wheel and axle means, a frame, and springs mounting the frame on the wheel and axle means, the combination of an engine unit, means mounting one end of the engine unit upon the frame and providing substantially universal and pivotal movement between the engine unit and the frame, means transversely extending mounting the other end of the engine unit upon some part of the vehicle and providing orbital and resiliently opposed substantially pivotal movement of that end of the engine unit with respect to the frame, and normally inactive means carried by the frame and resiliently limiting the movement of the last-named end of the engine unit with respect to the frame.

19. In an automotive vehicle having wheel and axle means, a frame, and springs mounting the frame on the wheel and axle means, the combination of an engine unit having a universal joint, means adjacent said joint mounting one end of the engine unit upon the frame and providing substantially universal and pivotal movement between the engine unit and the frame, means transversely extending mounting the other end of the engine unit upon some part of the vehicle and providing orbital and resiliently opposed substantially pivotal movement of that end of the engine unit with respect to the frame, and normally inactive means carried by the frame and resiliently limiting the movement of the last-named end of the engine unit with respect to the frame.

20. In a motor vehicle, the combination with an engine unit, of at least two longitudinally spaced resilient mounting structures supported by the vehicle and carrying the engine unit for resiliently opposed transverse movement in any direction of at least one end of the engine unit, combined with resiliently opposed torque cushioning oscillation about a centrally located longitudinally extending axis of oscillation, and a normally inactive cushion at the end of the engine unit mounted for transverse movement in any direction, said cushion acting to add further resilient resistance to said transverse movement in any direction after a predetermined amount of said movement.

ROLLAND S. TROTT.